United States Patent [19]

Hanley

[11] 4,232,488
[45] Nov. 11, 1980

[54] PORTABLE STAGE

[76] Inventor: William F. Hanley, c/o Magic Stage, 430 Salem St., Medford, Mass. 02155

[21] Appl. No.: 25,329

[22] Filed: Mar. 30, 1979

[51] Int. Cl.² .......................... E04H 3/10; A47B 3/00
[52] U.S. Cl. ............................................. 52/7; 52/69; 52/71; 52/143; 108/44; 108/112; 296/26
[58] Field of Search ...................... 280/30; 52/6, 7, 69, 52/71, 143; 108/112, 113, 44; 296/26

[56] References Cited

U.S. PATENT DOCUMENTS

| | | | |
|---|---|---|---|
| 2,635,889 | 4/1953 | Concello | 52/7 X |
| 3,258,884 | 7/1966 | Wenger | 52/6 |
| 3,417,518 | 12/1968 | Jaffe | 52/7 |
| 3,620,564 | 11/1971 | Wenger | 52/69 |
| 3,924,366 | 12/1975 | Gibbs | 52/69 |
| 4,026,076 | 5/1977 | Analetto | 52/6 |
| 4,155,204 | 5/1979 | Prozinski | 52/69 |

Primary Examiner—Alfred C. Perham
Attorney, Agent, or Firm—Jerry Cohen

[57] ABSTRACT

A portable stage comprises a truck body with a fixed roof forming a main fixed panel (A) of a stage which is made by foldable side wall panels of the truck which can fold out into B, C and even D and E extensions for establishing a 30 or 40 foot or even greater width stage (using such foldable panel assemblies on either side of the truck) or fold down to an array which fits entirely within the cross section envelope or frame of the truck for over-the-road travel. The length of the stage is the length of the truck body. Practical 0°-180° movement between end to end arranged panels B and C (or between C and D or D and E) is made possible by a series of actuating assemblies running the length of the truck and each of which comprises plural linear actuating rams (hydraulically or pneumatically operated) wherein one such ram makes a forward stroke for driving a panel through an extreme acute angle range of movement (e.g., 0°-60°) and an opposite stroke for driving the same panel through extreme obtuse angle movement (e.g., 120°-180°) and the other ram makes a stroke driving the panel in between such angular rates of movement, the rams both being similarly mounted on a relatively fixed one of the two panels and attached to the relatively moveable one of two panels between which the rams operate at points offset from the panel plane on a lateral extension of the relatively moveable panel to pivot such panels about an axis located on a lateral extension of the relatively fixed panel of the pair.

17 Claims, 9 Drawing Figures

PORTABLE STAGE

BACKGROUND OF THE INVENTION

The present invention relates to portable staging. For major public events, outdoors or in large arenas, the setting up of staging involves several days of construction, even when prefabricated modules are used to the maximum practical extent. The inventorying of parts to be assembled or disassembled creates vulnerability to loss or damage. Substantial commitments of skilled labor and supervision time are necessary parts of successful preparation.

It is an important object of the invention to provide portable stage apparatus which can be carried over the road and immediately erected without assembly of significant subassemblies or parts (such omission being made to a greater extent than in the state of the art), consistent with establishing a stage size when erected of at least 30 ft. by 30 ft. and preferably substantially larger in both major dimensions.

SUMMARY OF THE INVENTION

The objects of the invention are realized through a special truck body (meaning a truck trailer or the back part of a unitary truck) which has side panels that can fold out to form the stage. Preferably, the truck has a fixed roof which constitutes an essential portion of the stage running the length of the truck body which can be as long as 40-50 ft. consistent with highway requirements in most states. As a practical matter, the height of a side panel is limited to about 10 ft. or only slightly larger. In accordance with the invention, this limitation is overcome by providing folder under additional panels. The fixed roof of a truck when used, may be characterized as an A-section of a stage to be erected. Two panels mounted on opposite sides of the truck which can each swing between 0° and 90° to fold out when vertical to horizontal positions, can be characterized as B-panels and can be driven by conventional hydraulic rams mounted within the truck body. Then additional panels (at least C-panels and even D, E, etc. panels) are mounted as extensions of the B-panels. B-panels pivot about their upper end and their lower free ends have the C-panels pivoted thereto. C-panels are pivotally moveable between 0°-180° about pivotal axis which run lengthwise of the truck parallel to the length direction of the truck (as do the B-panel axis) and are located substantially at the junction of the B-C panels, but slightly offset from such junction. Lateral tab extensions of the B and C panels are connected together by a pivotal mount to define a fixed pivot mounting for the 0°-180° movement of the C-panel. Such lateral extension are hereinafter referred to as tabs which may be actual metal tabs or equivalents such as curled lips of the B and C panels. The mountings between C and D panels or between D and E panels are virtually identical.

As an aside, it would be appreciated from the following disclosure that 0°-180° swing can be such as to tuck the C panel under the B panel when the assemblage is folded down or the reverse 0°-180° motion so that the C panel folds down outwardly of the B panel (the former is preferred). Such choices are similarly available with respect to the mounting of the D to the C panel and the E to the D panel.

In accordance with the invention, the driving mechanism for the 0°-180° movement between the B and C panels (and similarly between the C and D panels or between the D and E panels, comprises a lengthwise (of the truck) array of linear actuating assemblies, rather than rotary drive assemblies which would have prohibitive weight, cost and energy requirements in relation to the object of the invention. Preferably, there are two linear actuators in each such assembly, although three may be provided for three distinct stages of stroking (preferably only two). The linear actuators are preferably fluid driven (hydraulic or pneumatic) preferably hydraulic, rather than utilizing such alternative means as direct electric actuators, worm drives from rotary motors, or the like, although such alternative means may be used with reduced efficiency within the broadest scope of the present invention. The three stages of 180° movement between halves of panels are extreme acute angle (e.g., 0°-60°), extreme obtuse angle (e.g., 120°-180°) and the range inbetween. One of the said fluid actuators of an actuating assembly makes a single stroke for the extreme acute angle movement to unfold the two nested together panels, then the other actuator is used for the inbetween range while the first actuator floats or free-wheels, as it were, then the first actuator makes an opposite stroke to its first stroke (or a third actuator is engaged for this purpose) to complete the extreme obtuse angle movement of the unfolding while the second actuator floats. This processing is reversed for folding the two panels back up again. The linear actuators are mounted from the relatively fixed one of said panels with free stroking ends of the actuators attached to an extension or extensions. It doesn't matter whether there are one or two extensions because they form a rigid body together with the relatively moveable panel. Since the fixed pivot is defined on a lateral extension of the relatively fixed panel which is offset from, but substantially at the junction of the relatively moveable and relatively fixed panel, the arrangement provides practical knuckling over of the difficult 90°± range without undue complexity of mechanical linkages and with reasonable cost, energy and weight requirements.

Additional accessories can be carried within the frame of the truck body such as stairs up to a trap door or opening in section A, electrical, sound and light systems associated with the stage. An elevatable roof can be mounted on top of section A and the hydraulic lift for it can be within the cross section envelope of the truck body. Leg supports for the extended side panels of the truck body must be inserted under them and can have the form of foldable legs attached to such panels which nest within the folded side panel structures.

Such an apparatus can travel over the road to a distant place of an outdoor festival and be erected as a massive stage within a matter of hours, or minutes, rather than days after arrival. All substantial parts are tied together and vulnerability to loss or damage is thereby reduced compared to the state of the art apparatus. Labor and supervision requirements are minimal compared to the state of the art constructions. After the public event, the cite can be cleared very quickly by folding down the side panels and driving the truck away.

Several truck bodies (trailors) can be used together to extend the length of the stage, each such trailor having a similar array of side panels as described above. While it is preferred to have a substantial width fixed A section, as described above, such A section can be dispensed, and instead, the B sections can meet together when they are pivoted out 90° to their horizontal position. While it is preferred to have symmetrical arrays of side panels on both sides of the truck body, such an array of panels can be provided on only one side (preferably with some other suitable counterweight on the other side of the truck body).

Many additional objects of the invention are implicit from the foregoing general summary thereof.

Other objects, features and advantages of the invention will be apparent from the following detailed description, taken in connection with the accompanying drawing, in which:

DETAILED DESCRIPTION OF PREFERRED EMBODIMENTS

Figure 1:
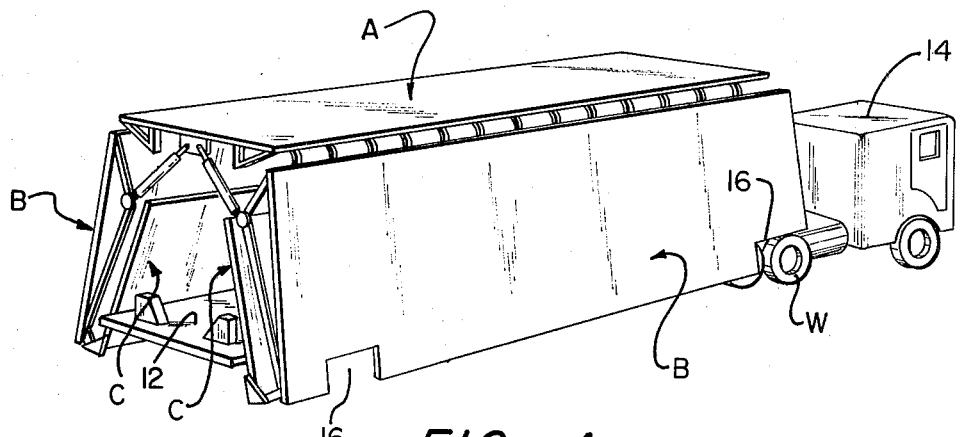
FIGS. 1–3 are isometric views of an apparatus constructed with a preferred embodiment of the invention in various positions of folding and unfolding as in the above described side panels.
Figure 2:
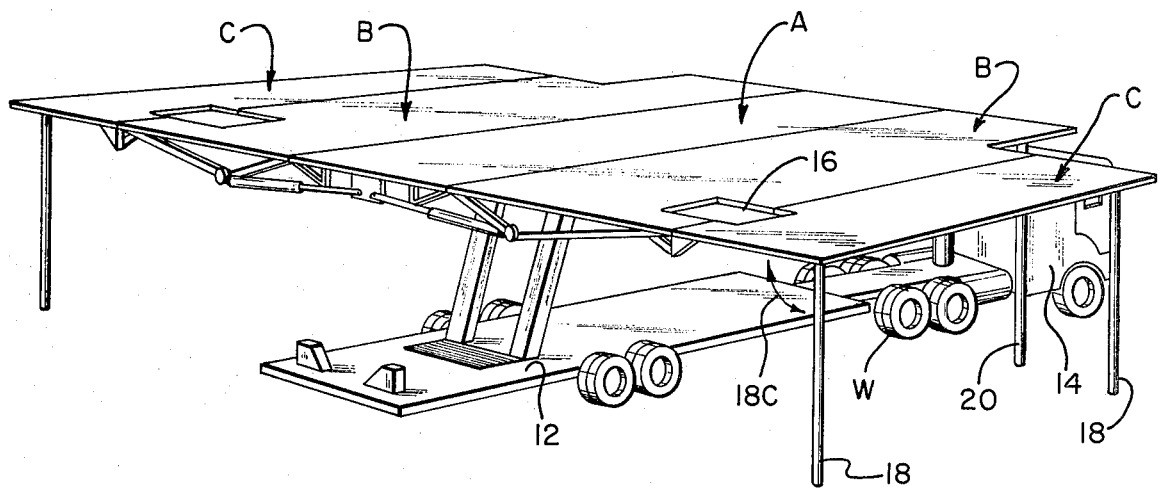
Figure 3:
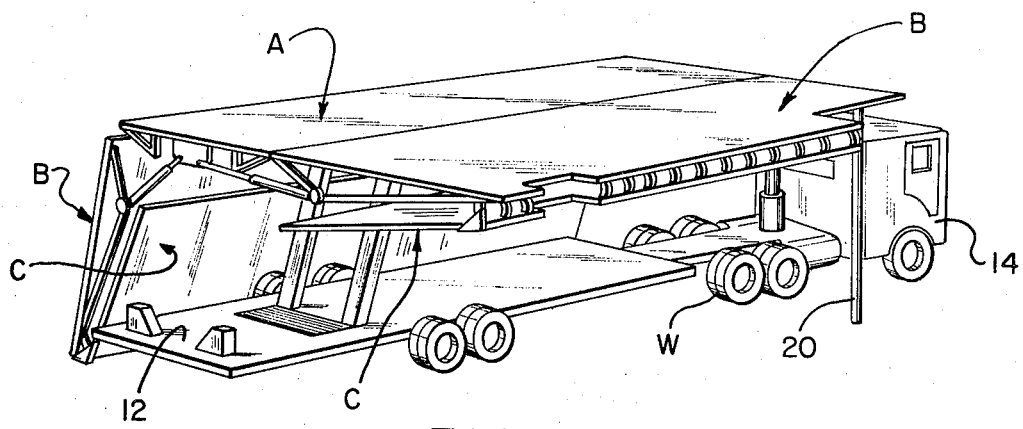

As shown in FIG. 1, a truck trailor 12, with a cab 14 and wheels as indicated at W has the general form, including cross section envelope or frame of an over the road vehicle allowable on state highways, a top fixed panel A running the length of the truck body (of the trailer in this embodiment) and side panels B and C affixed thereto and arranged so that panels B move between 0° and 90°, i.e., between the 0° folded down position of FIG. 1 to the 90° folded out, horizontal position of FIG. 2 (and for the right panel B in FIG. 3). Panels C are moveable between 0° and 180° positions, the 180° position being shown in FIG. 2 and the 0° position being shown for both of them in FIG. 1 and for one of them (the left one) in FIG. 3. Wheel cut outs 16 are provided in the B and C panels to accommodate the wheels W and make maximum use of the truck width and allowable height of panels. The unfolding of panels can be operated symmetrically as shown in FIGS. 1–2 and preferably it is done this way, or asymmetrically as in FIG. 3. Struts supports 18 and 20 are provided under the panel C and D and preferably are pivotally mounted to such panels for swinging as indicated at 18C so that when the panels are folded up, the supports can nest within the folded assembly of panels. The 0° positioning is approximate since room must be allowed for rigidizing truss-work and the like, as is illustrated for panel B in the rear of the truck indicated in FIG. 1 where conventional actuators (hydraulic rams) are shown for driving panel B between its 0° and 90° positions. Although one such actuator is indicated for each such panel B, it will be appreciated that there will be a lengthwise array of such actuated (lengthwise of the truck) along the length of panel B for simultaneously operating (through simultaneous admittance of hydraulic driving fluid in a consistent fashion to each such actuator), rather than relying on rigidity of the panel or use of a single pair of heavy actuators. Similarly, the drives between relatively folded moveable panels D and C (to be described below in connection with FIGS. 4–7) comprise lengthwise arrays of actuating assemblies.

Figure 4:
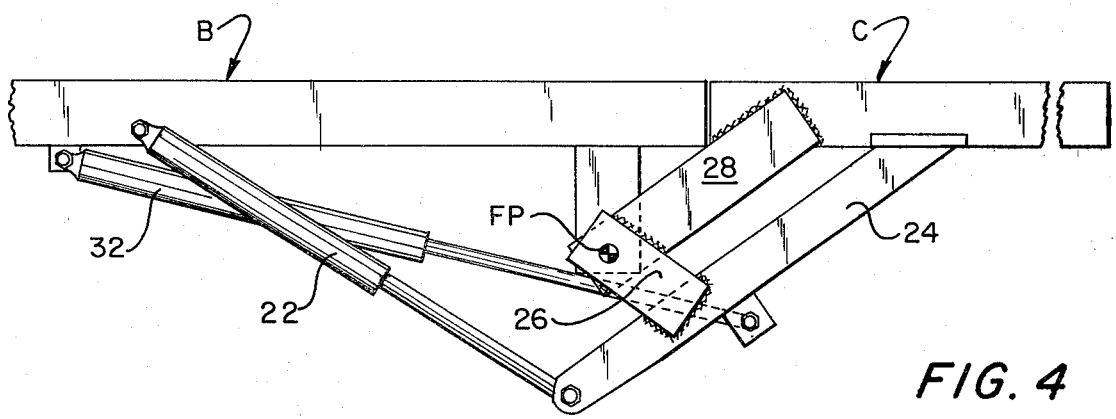
FIGS. 4–7 are end or cross section views of the junction of the B and C panels (which is also typical of the C-D and D-E panel junction, if used) in four different positions of relative folding and unfolding therebetween.
Figure 5:
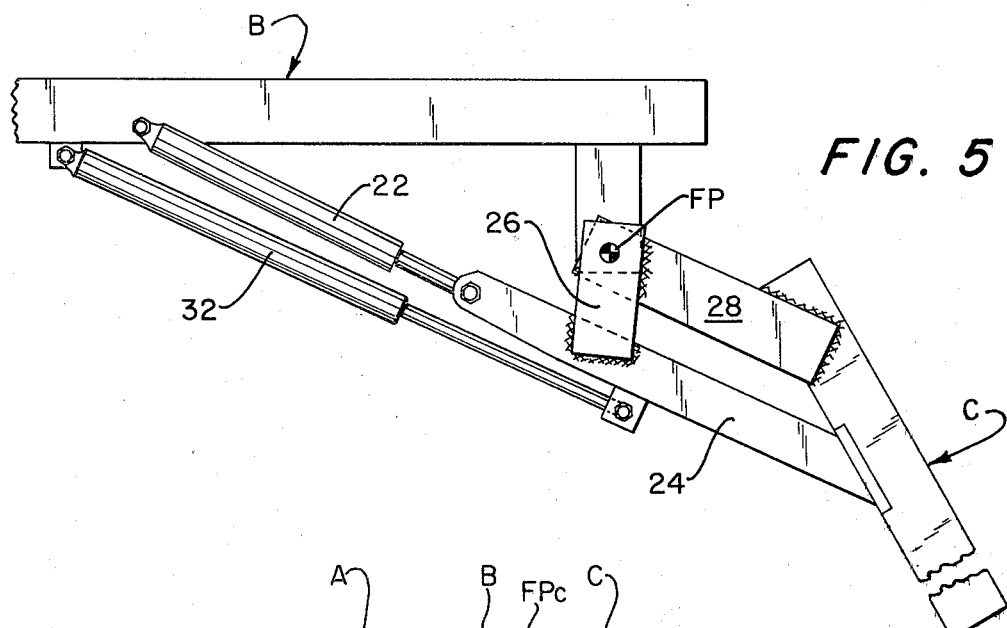
Figure 6:
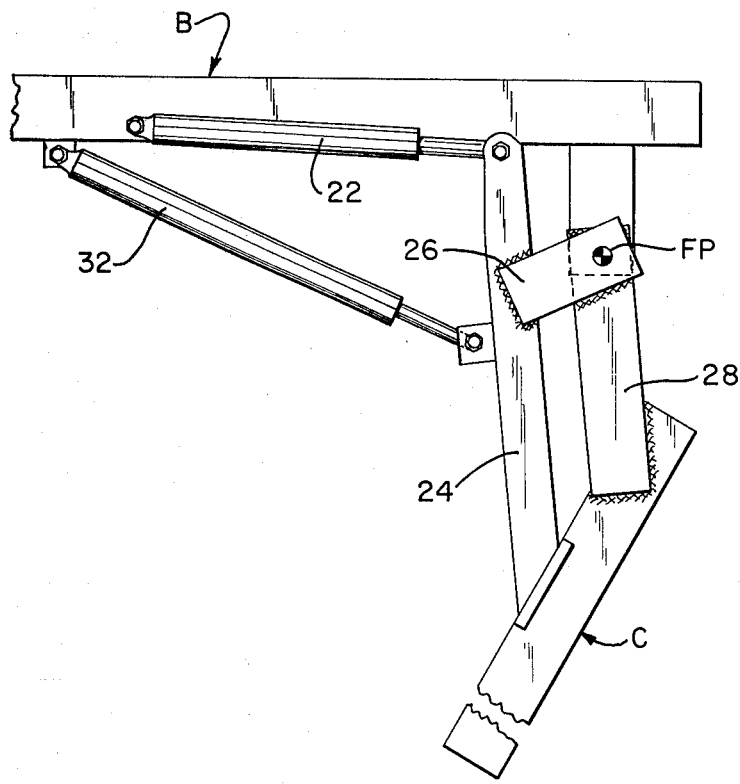
Figure 7:
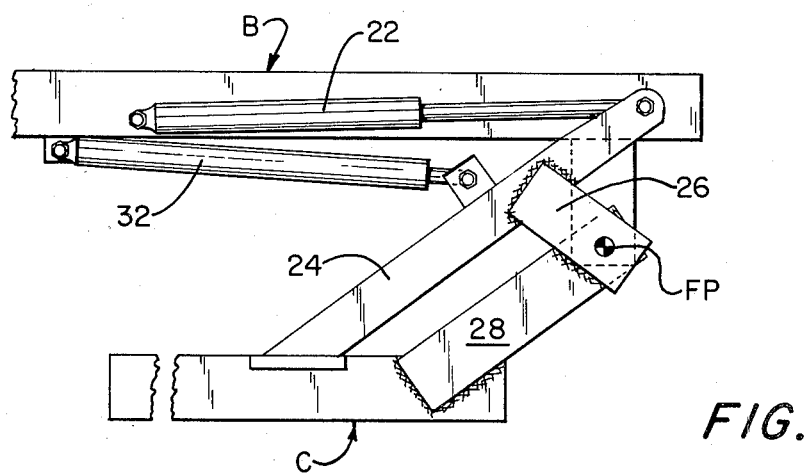

Referring now to FIGS. 4–7, the junction of panels B and C is indicated at the fully folded out (180°) position in FIG. 4, partially folded (after movement through the obtuse angle range) position in FIG. 5, further partially folded in position in FIG. 6 and final folded up position of FIG. 7 (the 0° position after moving through the acute angle range of positions from the FIG. 6 position). An actuating assembly comprising a pair of hydraulic rams 22 and 32 for accomplishing the FIGS. 4–7 movement is shown in all four of these figures. Extension elements 24, 26 and 28, all of which are tabs welded together and comprising, in essence, a rigid body extension of panel C are mounted to a similar lateral extension of panel B at a fixed pivot FP. In moving from the FIG. 4 position to the FIG. 5 position, the ram 22 is actuated to pull directly on extension 24, but in effect on panel C, while ram 32 is floating. Then the hydraulic control system (not shown, but conventional per se) is operated to leave ram 22 floating while powering ram 32 for drive stroke inward to achieve the movement shown indicated between FIGS. 5 and 6. Then ram 32 is allowed to float while ram 22 is powered to drive outwardly against extension 24 and in effect against panel C to complete its folding through the acute angle range of movement. Reversing the entire sequence just described provides the complete unfolding motion of 0°–180°. It will also be appreciated that while the whole sequence and apparatus assembly is shown for folding C under panel B, it can be arranged as a mirror image of what is shown in FIGS. 4–7 to move panel C to a 180° movement shown in FIG. 4 to ultimately fold down on top of panel B so that later when panel B is pivoted down through a 90° motion to its FIG. 1 position, panel C would then be on the outside rather than inside of the folded up assembly. However, the arrangement as shown in the drawings is preferred.

Figure 8:
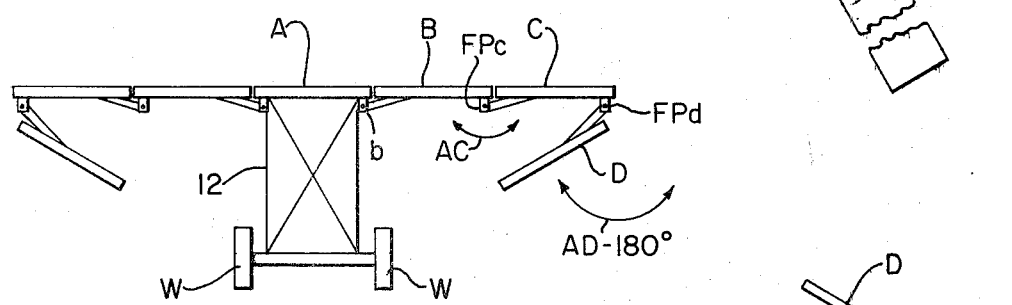
FIGS. 8 and 8A are line drawings illustrating the use of a D panel in addition to the A, B, C panels shown in FIGS. 1–7.
Figure 8A:
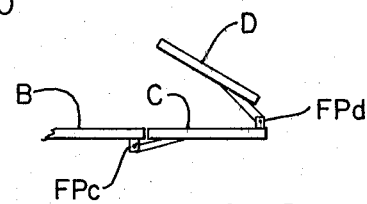

FIGS. 8 and 8A are line drawings illustrating the utilization of a D panel mounted to and moveable with respect to the C panel in the same way that the C panel is mounted to and moveable from the B panel on each side of the truck (or on at least one side of the truck as mentioned above). It will be appreciated that the FIG. 8A embodiment is less desirable than the FIG. 8 embodiment since in FIG. 8A, hinging structure will be on-stage, but this may be tolerable in some stage or non-stage applications.

A further preferred embodiment has been made and successfully operated using only the array of pistons 22 and eliminating the array 32, utilizing gravity and the support leg driving pistons as the "second" driving array. Referring to the same drawing figures as for the above first described embodiment, this second preferred embodiment is now described.

The B panels are swung out 90° as before (i.e., from the FIG. 1 to FIG. 3 [night side] illustrated positions). Then the C panels are dropped by allowing their pistons 22 to hydraulically float. This effects a movement to the FIG. 6 position. Then the B legs (see e.g., 20 in FIGS. 2–3) of which there are a whole linear array along the lengths of the outer edges of panels B are hydraulically driven by separate actuators (not shown, or by a single actuator driving a whole series of such legs, tied together). This is a sample 0° (horizontal) to 90° (vertical) movement of such legs. The legs "bump" into the lower portion of the truss work of the C panels (not shown, but similar to that shown for B panels in FIGS. 2–3) and push the C panels to the FIG. 5 position, i.e., building the C panels over the center. Then pistons 22 are powered to extend panel C to the FIG. 4 position. The legs of the C panels, 18, are then extended.

Collapsing C panels from the FIGS. 4 to 7 positions involves the following reversal of steps. First, legs 18 of the C panels are retrieved and nested up against the panels' inside faces, while then powered hydraulic cylinders 22 prevent collapse of panels C. Then legs 20 of panel B are lifted while the powered hydraulic actuators shown in FIGS. 1–3 hold up the B panels. Then power is released from actmators 22 so that the C panels fall when they fall. When they fall, they go all the way from the FIG. 4 to FIG. 6 position because the location of their center of gravity is selected to make the latter the stable position therefor. Then jacks 22 are powered to pull the C panels up to the FIG. 7 position. Then the B panels can be lowered to the FIG. 1 position.

The bumping of C panels from the FIGS. 6 to 5 position approximately can be done between a truss on the C panels and individual legs or between a strapping together truss on the legs and the C panel truss or may utilize special detents on the legs and/or panel provided just for the bumping purpose.

Other use of the apparatus utilizing one or more (or combinations) of the above features thereof are as portable shelters, spreading the nested panels in gull wing fashion; as concrete or plastic construction forms or armatures (using release coatings on the panels to prevent sticking of case or sprayed-on concrete or plastic); as bridges or walkways; or as bleachers or solar collector, wide area antenna movie/video screen billboard or scoreboard (spreading one group of panels on one side up and the other side down).

The extended stage can be raised or lowered, e.g. on by mounting the relatively fixed section A on conventional hydraulic scissors or jacks or the like mounted on the truck bed to be lowered after panels B and C are extended on one or both sides and raised prior to reresting panels B and C. Such means are part of the invention. It is often particularly useful to lower a 12 foot high extended stage to a 3–4 foot height for many audience situations.

The extended stage can be pivoted as a whole by pivoting the section A via conventional rotary drives resting on position B straddling the ends of section A, or by use of linear actuators mounted on the truck body pulling on an extended stage portion (of the B panels) to drive the whole stage about a pivotal axis running through or somewhat above or below the section A, including pivoting of A as well as extended panels B-C, the extended stage pivoting as a rigid body. The pivoting will usually be 90° e.g. for movie screen usage or the like. Raising or lowering of the stage may be done prior to pivoting.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Portable extendable, wide area apparatus, usable for stages and the like, mountable on and compressible to an over-the-road truck cross section frame and expandable to a flat staging width on at least one side of the truck of two or more times truck height and comprising, means forming a B panel arranged to hang vertically and pivot 0°–90° about a first pivotal axis running parallel to the truck length and located at elevation above the truck body and within the said cross section frame thereof and high enough so that the lower free end of the said B panel clears the ground when the panel is vertically arranged (at 0°), means for driving the B panel about its pivotal axis, means forming a C panel pivotally mounted to be movable 0° to 180° about a second axis running parallel to the truck length located substantially at and mounted on, but offset from said free end of the B panel and, means mounted on said B panel for driving the C panel about its pivot and comprising separate means, alternatively engageable, for driving the panel through extreme acute and obtuse angles and for driving the C panel in between said extreme angle ranges of motion, the B-C panels when at their respective 90° and 180° pivotal extensions forming a stage raised above the ground, means for supporting such raised stage, the 0° position of the C and B panels comprising a folded up panel array constituting a side wall of the truck.

2. Apparatus in accordance with claim 1 wherein a further D panel is pivotable from the outer free end of the C panel and similarly drivable therefrom to pivot between 0° and 180° to define a stage extension of the C panel (at 180°) and to be folded under the C panel (at 0° and movable therewith and means for supporting the D panel as an extension.

3. Apparatus in accordance with either of claims 1 or 2 wherein two similar pivotal panel arrays are arranged symmetrically on opposite sides of the truck body.

4. Apparatus in accordance with either of claims 1 or 2 in combination with truck cab, and motive power and wheel means.

5. Apparatus in accordance with either of claims 1 or 2 wherein said supporting means are pivotably mounted on the respective panels they support and nestable within the folded up panels.

6. Apparatus in accordance with claim 1 wherein the C panel folds up under the B panel.

7. Apparatus in accordance with claim 1 wherein the C panel drive means comprise an array lengthwise of the truck of driving assemblies each of which comprise plural linear motors pivotably mounted on the B panel and having free ends connected to a tab extension of the C panel, the C panel tab extension also being pivotally mounted at said second axis to a lateral extension of said B panel, the points of attachment of the plural linear motors to the C panel tab extension being spaced therealong, the linear activators providing separate driving strokes for movement of the C panel in the extreme acute angle range, extreme obtuse angle range and in between.

8. Portable extendable, wide area apparatus, usable for stages and the like, mountable on and compressible to an over-the-road truck cross section frame and expandable to a flat staging width on at least one side of the truck of two or more times truck height and comprising, means forming a B panel arranged to hang vertically and pivot 0°–90° about a first pivotal axis running parallel to the truck length and located at elevation above the truck body and within the said cross section frame thereof and high enough so that the lower free end of the said B panel clears the ground when the panel is vertically arranged (at 0°),
   means for driving the B panel about its pivotal axis,
   means forming a C panel pivotally mounted to be movable 0° to 180° about a second axis running parallel to the truck length located substantially at and mounted on, but offset from said free end of the B panel and,
   means for driving the C panel about its pivot and comprising separate means, alternatively engageable, for driving the panel through extreme acute and obtuse angles and for driving the C panel in between said extreme angle ranges of motion,
   the B-C panels when at their respective 90° and 180° pivotal extensions forming a stage raised above the ground,
   means for supporting such raised stage,
   the 0° position of the C and B panels comprising a folded up panel array constituting a side wall of the truck.

9. Apparatus in accordance with claim 8 wherein a further D panel is pivotable from the outer free end of the C panel and similarly drivable therefrom to pivot between 0° and 180° to define a stage extension of the C panel (at 180°) and to be folded under the C panel (at 0° and movable therewith and means for supporting the D panel as an extension.

10. Apparatus in accordance with either of claims 8 or 9 wherein two similar pivotal panel arrays are arranged symmetrically on opposite sides of the truck body.

11. Apparatus in accordance with either of claims 8 or 9 in combination with truck cab, and motive power and wheel means.

12. Apparatus in accordance with either of claims 8 or 9 wherein said supporting means are pivotably mounted on the respective panels they support and nestable within the folded up panels.

13. Apparatus in accordance with claim 8 wherein the C panel folds up under the B panel.

14. Apparatus in accordance with claim 8 wherein the C panel drive means comprise an array lengthwise of the truck of driving assemblies each of which comprise plural linear motors pivotably mounted on the B panel and having free ends connected to a tab extension of the C panel, the C panel tab extension also being pivotally mounted at said second axis to a lateral extension of said B panel,
   the points of attachment of the plural linear motors to the C panel tab extension being spaced therealong,
   the linear activators providing separate driving strokes for movement of the C panel in the extreme acute angle range, extreme obtuse angle range and in between.

15. Apparatus in accordance with either of claims 1 or 8 and further comprising means for adjusting elevation of the extended panel structure as a whole.

16. Apparatus in accordance with either of claims 1 or 8 and further comprising means for pivoting the extended panel structure as a whole.

17. Apparatus in accordance with either of claims 1 or 8 and further comprising means for adjusting elevation of the extended panel structure as a whole,
   means for pivoting the extended panel structure as a whole.

* * * * *